United States Patent
Yang

(10) Patent No.: US 9,917,317 B2
(45) Date of Patent: *Mar. 13, 2018

(54) COMBINED FUEL CELL AND BOILER SYSTEM

(71) Applicant: KYUNGDONG NAVIEN CO., LTD., Pyeongtaek-si, Gyeonggi-do (KR)

(72) Inventor: Dong Jin Yang, Yeosu-si (KR)

(73) Assignee: KYUNGDONG NAVIEN CO., LTD., Pyeongtaek-si (KR)

( * ) Notice: Subject to any disclaimer, the term of this patent is extended or adjusted under 35 U.S.C. 154(b) by 64 days.

This patent is subject to a terminal disclaimer.

(21) Appl. No.: 14/405,154

(22) PCT Filed: Mar. 28, 2013

(86) PCT No.: PCT/KR2013/002595
§ 371 (c)(1),
(2) Date: Dec. 2, 2014

(87) PCT Pub. No.: WO2013/183854
PCT Pub. Date: Dec. 12, 2013

(65) Prior Publication Data
US 2015/0104725 A1  Apr. 16, 2015

(30) Foreign Application Priority Data

Jun. 4, 2012  (KR) .................. 10-2012-0059676

(51) Int. Cl.
*H01M 8/06* (2016.01)
*F24H 1/00* (2006.01)
(Continued)

(52) U.S. Cl.
CPC ......... *H01M 8/0618* (2013.01); *F24D 11/005* (2013.01); *F24D 12/02* (2013.01);
(Continued)

(58) Field of Classification Search
None
See application file for complete search history.

(56) References Cited

U.S. PATENT DOCUMENTS 4,080,487 A * 3/1978 Reiser ................ H01M 8/0612
429/408
5,082,752 A * 1/1992 Koga ................ H01M 8/0612
429/423

(Continued)

FOREIGN PATENT DOCUMENTS

AT   406 900 B    9/2008
DE   37 16 297 A1  12/1988

(Continued)

OTHER PUBLICATIONS

International Search Report dated Jun. 12, 2013, issued to corresponding International Application No. PCT/KR2013/002595.

*Primary Examiner* — Barbara L Gilliam
*Assistant Examiner* — Zhongqing Wei
(74) *Attorney, Agent, or Firm* — Stein IP, LLC

(57) ABSTRACT

The present invention relates to a combined fuel cell and boiler system, and comprising: a fuel cell portion for receiving supplied outside air and raw material gas and generating electricity through a catalyst reaction; and a boiler portion comprising a latent heat exchanger, which is connected to an exhaust gas pipe of the fuel cell portion, for collecting the latent heat of self-generated exhaust gas with the latent heat of exhaust gas from the fuel cell portion. The present invention can effectively increase the efficiency of a boiler by supplying the exhaust gas from the fuel cell to the latent heat exchanger in the boiler, so as to be heat-exchanged in the latent heat exchanger with the exhaust gas from the boiler and then discharged, and can simplify the composition by unifying exhaust gas pipes.

5 Claims, 3 Drawing Sheets

(51) Int. Cl.
  *H01M 8/0612* (2016.01)
  *H01M 8/04007* (2016.01)
  *F24D 12/02* (2006.01)
  *F24H 9/00* (2006.01)
  *F24H 9/14* (2006.01)
  *F24D 11/00* (2006.01)

(52) U.S. Cl.
  CPC ............ *F24H 1/00* (2013.01); *F24H 9/0026* (2013.01); *F24H 9/0084* (2013.01); *F24H 9/14* (2013.01); *H01M 8/04067* (2013.01); *H01M 8/0631* (2013.01); *F24D 2200/18* (2013.01); *F24D 2200/19* (2013.01); *F24D 2200/32* (2013.01); *F24D 2220/06* (2013.01); *F24H 2240/10* (2013.01); *H01M 2250/405* (2013.01); *Y02B 10/70* (2013.01); *Y02B 30/14* (2013.01)

(56) References Cited

U.S. PATENT DOCUMENTS

| | | | |
|---|---|---|---|
| 6,887,607 B1 * | 5/2005 | Scholten | B01J 8/043 |
| | | | 165/104.34 |
| 2004/0163312 A1 * | 8/2004 | Bloomfield | B01J 19/0006 |
| | | | 48/214 A |
| 2006/0251934 A1 | 11/2006 | Valensa et al. | 429/20 |
| 2007/0248860 A1 * | 10/2007 | Penev | H01M 8/04022 |
| | | | 429/435 |
| 2008/0118800 A1 * | 5/2008 | Devriendt | H01M 8/04014 |
| | | | 429/423 |
| 2011/0223501 A1 * | 9/2011 | Uematsu | H01M 8/0618 |
| | | | 429/415 |

FOREIGN PATENT DOCUMENTS

| | | | | |
|---|---|---|---|---|
| DE | 100 00 405 A1 | 7/2000 | | |
| EP | 0 818 840 A1 | 1/1998 | | |
| EP | 1 030 123 A2 | 8/2000 | | |
| EP | 1855342 A2 * | 11/2007 | ............ | H01M 8/04 |
| JP | H01-128365 A | 5/1989 | | |
| JP | H 8-148166 A | 6/1996 | | |
| JP | H08148166 A * | 6/1996 | ............ | H01M 8/04 |
| JP | H11-086893 A | 3/1999 | | |
| JP | H11-153360 A | 6/1999 | | |
| JP | 2003-185388 A | 7/2003 | | |
| JP | 2003-236565 A | 8/2003 | | |
| JP | 2005-147647 A | 6/2005 | | |
| JP | 2011-179761 A | 9/2011 | | |
| JP | 2012-17965 A | 1/2012 | | |
| KR | 10-0787244 B1 | 12/2007 | | |
| KR | 10-0790901 B1 | 1/2008 | | |
| KR | 10-2009-0078700 A | 7/2009 | | |
| KR | 1020090078700 A * | 7/2009 | ............ | H01M 8/04 |
| KR | 2010083027 A * | 7/2010 | ............ | H01M 8/12 |

* cited by examiner

COMBINED FUEL CELL AND BOILER SYSTEM

CROSS-REFERENCE TO RELATED APPLICATIONS

This invention is a national stage of International Application No. PCT/KR2013/002595, filed Mar. 28, 2013, which claims the benefit of priority to Korean Application No. 10-2012-0059676, filed Jun. 4, 2012, in the Korean Patent Office. All disclosures of the documents named above are incorporated herein by reference.

BACKGROUND OF THE INVENTION

Field of the Invention

The present invention relates to a combined fuel cell and boiler system, and more particularly to a combined fuel cell and boiler system, in which thermal efficiency of a boiler may be improved by using an exhaust gas from a fuel cell.

Description of the Related Art

In general, most of energies used by humans have been obtained from fossil fuels. However, the use of the fossil fuels has significantly adverse effects on environment, such as air pollution, acid rain, global warming, and also brings about a problem of low energy efficiency.

To solve the problems caused by using the fossil fuels, fuel cell systems have been recently developed. The fuel cells are different from typical secondary batteries in that the fuel cells have a structure in which electricity is generated by supplying fuels, such as hydrogen gas or hydrocarbon, to an anode and supplying oxygen to a cathode.

That is, fuel cells are referred to as "cells", however in reality, may be regarded as power generators for generating electricity. Basically, the fuel cells employ a method in which fuels are not combusted but an electro-chemical reaction between hydrogen and oxygen is triggered, and an energy difference before and after the reaction is converted to electrical energy.

The fuel cells do not generate gases, such as NOx, SOx, which cause environmental pollution, and are noiseless and vibrationless systems, so that the fuel cells may be considered a clean power-generation system having the thermal efficiency of 80% or more by adding up an electricity generation amount and a heat collecting amount.

The reaction between hydrogen and oxygen in a fuel cell is an exothermic reaction, and thus generates heat. Phosphoric acid is mainly used as an electrolyte in the fuel cell, and such a phosphoric acid fuel cell is known to have an operation temperature of about 200° C. This temperature is a maximum allowable temperature for a phosphoric acid electrolyte. The reaction between hydrogen and oxygen is most actively performed at about 200° C., which is a reaction temperature of a fuel cell; however, heat is generated by the exothermic reaction between hydrogen and oxygen and thus the reaction between hydrogen and oxygen is not readily performed, thereby leading to a decrease in efficiency. Accordingly, a cooling structure for cooling the fuel cell is essentially required.

Also, as another example of a fuel cell, there is a molten carbonate type fuel cell in which a mixture of lithium carbide and potassium carbide which have a low melting point is used as an electrolyte. An operation temperature of the molten carbonate type fuel cell is about 650° C., and a hot box is installed to maintain the operation temperature.

In order to maintain the operation temperature having a close relation with the efficiency of the fuel cell and to improve power generation efficiency, various fuel cell systems have been proposed.

For example, Korean Patent No. 10-0787244 discloses a structure which includes an air supply unit for supplying oxygen-containing air for effective combustion of raw materials for power generation, and which uses a double intake method of allowing outside air to be introduced for properly lowering the temperature of a hot box so as to generate electrical power using oxygen of the intaken air.

The intaken air is finally discharged to the outside. In this case, the exhaust gas is higher in temperature than outside air, and this may cause a problem in that a white gas is generated when the exhaust gas is discharged.

Also, Korean Patent No. 10-0787244 discloses a structure in which a carbon monoxide remover for removing carbon monoxide is connected to an intake passage in order to supply oxygen-containing air.

However, this structure directly supplies air which is supplied through an outside air intake container, an air intake port, and a filter, to a fuel treatment unit, etc., by using an air supply pressure adjustment unit. Because room-temperature air is directly supplied and used, there may be a phenomenon that an internal temperature of the hot box is lowered. When the temperature of the hot box is thus lowered than a reaction temperature, there is a problem in that power generation efficiency may be lowered.

SUMMARY OF THE INVENTION

Technical Problem

The present invention is provided to solve the above-described problems. An object of the present invention is to provide a combined fuel cell and boiler system which may effectively use heat of exhaust gas from a fuel cell.

Another object of the present invention is to provide a combined fuel cell and boiler system which may minimize an internal temperature variation of a hot box caused by outside air introduced.

Another object of the present invention is to provide a combined fuel cell and boiler system which may simplify a system structure by unifying an air intake line and an air exhaust line.

Technical Solution

Embodiments of the present invention provide a combined fuel cell and boiler system, which may include a fuel cell portion receiving outside air and raw material gas, and generate electricity through a catalytic reaction; and a boiler portion including a latent heat exchanger connected to an exhaust gas pipe of the fuel cell portion, and collecting latent heat of exhaust gas of the fuel cell portion together with latent heat of self-generated exhaust gas.

In an embodiment, the boiler portion may include a connection pipe connected to the exhaust gas pipe, and supplying exhaust gas of the fuel cell portion to the latent heat exchanger by guiding the exhaust gas of the fuel cell portion to contact a side surface of the latent heat exchanger.

In another embodiment, the fuel cell portion may include a hot box for accommodating a fuel cell and a reformer; a start burner for heating the hot box such that the temperature of the hot box reaches a reaction temperature in an initial operation; a first heat exchange portion which heats outside air by using heat of the start burner or heat of the exhaust gas and supplies the heated air into the hot box; and a second heat exchange portion generating steam using heat of the exhaust gas, supplying the steam, and maintaining the reaction temperature by cooling the fuel cell using the exhaust gas having a lowered temperature.

In another embodiment, the reformer may include a reforming portion for receiving the raw material gas and the steam to reform the gas and the steam into hydrogen gas; and a burner for heating the reforming portion.

In another embodiment, the burner may heat the reforming portion by an exothermic reaction in which unreacted oxygen and hydrogen after reaction in the fuel cell are reacted.

In another embodiment, the burner may include a primary burner and a secondary burner, and the unreacted oxygen and hydrogen are sequentially supplied to the primary and secondary burners.

In another embodiment, the system may further include a combustion gas line provided to surround the inside of the hot box, connected to the first heat exchange portion, and maintaining a reaction temperature by heating the hot box using heat of the start burner and by cooling the hot box using the exhaust gas from the second heat exchange portion.

Advantageous Effects

A combined fuel cell and boiler system according to the present invention supplies exhaust gas of a fuel cell to a latent heat exchanger of a boiler so as to be heat-exchanged in the latent heat exchanger and then discharged with the exhaust gas of the boiler, thereby enhancing boiler efficiency and also simplifying a structure by unifying exhaust gas pipes.

Also, the system of the present invention is equipped with a means for heating outside air in an initial operation, continuously heats the intaken outside air using exhaust gas, and supplies the heated air to prevent an internal temperature variation of a hot box caused by introduction of outside air, thereby maintaining the internal temperature of the hot box to a reaction temperature to prevent a decrease in power generation efficiency.

Also, the system of the present invention is configured to use exhaust gas to generate steam for reforming raw material gas and relieve an increased amount of heat generated in a fuel cell, and to heat introduced outside air. Thus, the present invention has effects of enhancing efficiency of a system configuration and simplifying the configuration. Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawing of which.

[Description of the Reference Symbols]

| | |
|---|---|
| 100: Fuel cell portion | 200: Boiler portion |
| 110: Start burner | 111: Combustion gas line |
| 120: First heat exchange portion | 130: Hot box |
| 140: Reformer | 141: Primary burner |
| 142: Reforming portion | 143: Secondary burner |
| 144: Exhaust gas pipe | 150: Fuel cell |
| 151: Cathode | 152: Anode |
| 153: Connection pipe | 160: Second heat exchange portion |
| 170: Exhaust gas pipe | 210: Blower |
| 220: Downward combustion-type burner | 230: Combustion chamber |
| 240: Sensible heat exchanger | 250: Latent heat exchanger |
| 261: Supply pipe | 262: Return water pipe |
| 263: Connection pipe | 270: Condensed water collector |
| 280: Discharge hole | 290: Exhaust hood |

DESCRIPTION OF THE EMBODIMENTS

Figure 1:
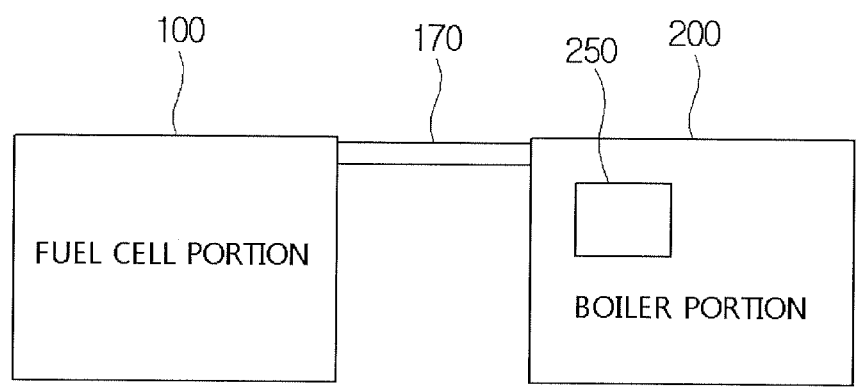
FIG. 1 is a configuration diagram illustrating a combined fuel cell and boiler system according to an exemplary preferred embodiment of the present invention.

FIG. 1 is a configuration diagram illustrating a combined fuel cell and boiler system according to a preferred embodiment of the present invention.

Referring to FIG. 1, a combined fuel cell and boiler system according to a preferred embodiment of the present invention, includes: a fuel cell portion 100 receiving outside air and raw material gas, and generating electricity through a catalytic reaction; and a boiler portion 200 including a latent heat exchanger 250, and connected to an exhaust gas pipe 170 of the fuel cell portion 100 so that exhaust gas of the fuel cell portion is supplied to a front end of the latent heat exchanger 250.

Hereinafter, more detailed description will be given of a structure and functions of a combined fuel cell and boiler system according to a preferred embodiment of the present invention.

First, the fuel cell portion 100, including a fuel cell, intakes outside air, receives fuel gas such as natural gas to reform the air and gas into oxygen and hydrogen respectively, and generates electricity through a catalytic reaction in the included fuel cell. The generated electricity is stored by using a storage battery, etc., or is directly used. The boiler portion 200 may use electricity produced in the fuel cell portion 100 as a power source.

The fuel cell portion 100 has an exhaust gas pipe 170 discharging gas, which is not involved in the catalytic reaction, or unreacted gas to the outside. The gas discharged through the exhaust gas pipe 170 is heated while used for cooling the fuel cell in a hot box which will be described later.

Thus, the exhaust gas of the fuel cell portion 100, which is discharged through the exhaust gas pipe 170, is introduced into a front end of the latent heat exchanger 250 of the boiler portion 200, so that waste heat may be collected in the latent heat exchanger 250.

Figure 2:
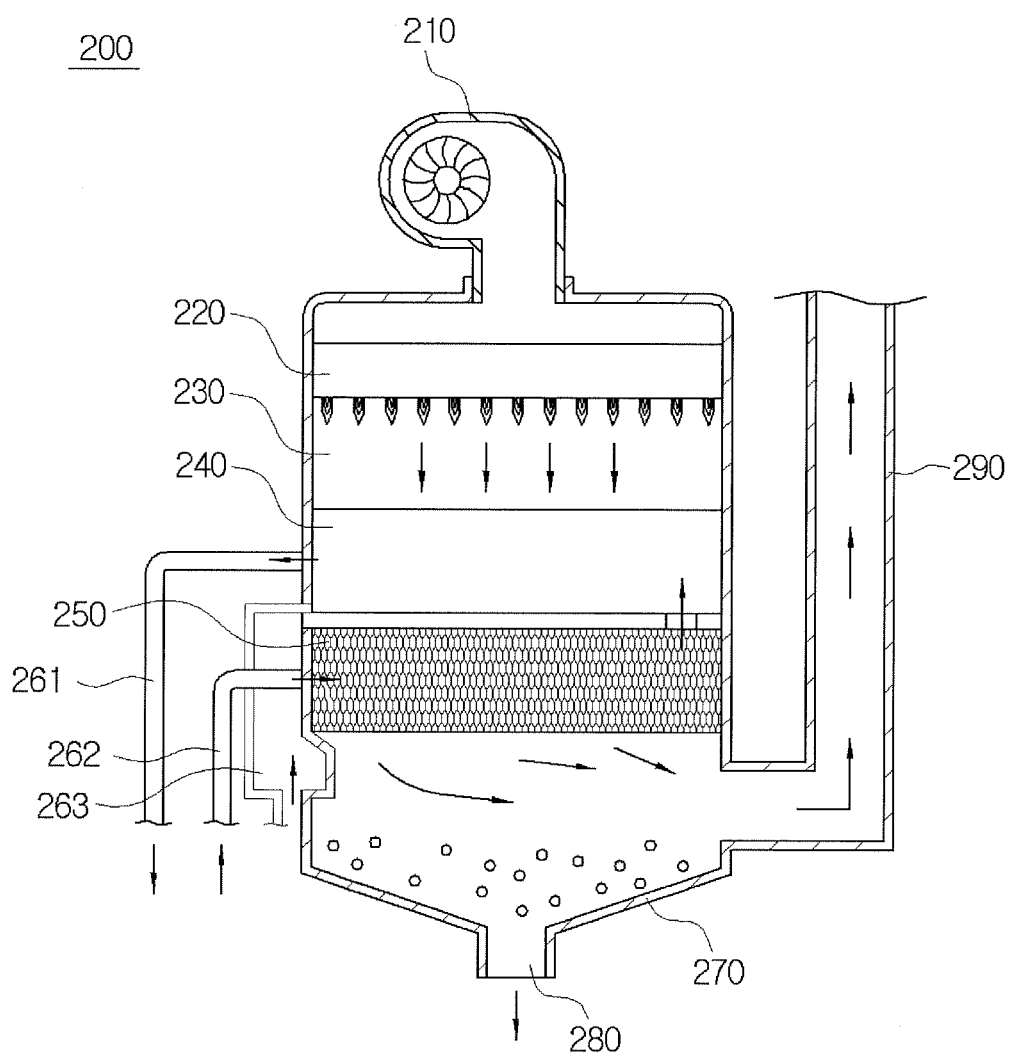
FIG. 2 is a detailed configuration diagram illustrating a boiler portion in FIG. 1.

FIG. 2 is a detailed configuration diagram illustrating the boiler portion 200.

Referring to FIG. 2, the boiler portion 200 has a structure which includes a blower 210 located at the uppermost end thereof; a downward combustion-type burner 220, a combustion chamber 230, a sensible heat exchanger 240, and a latent heat exchanger 250, which are subsequently located under the blower 210; a condensed water collector 270 and a condensed water discharge hole 280 located under the latent heat exchanger 250; an exhaust hood 290 installed at one side of the collector; and a connection pipe 263 located between the sensible heat exchanger 240 and the latent heat exchanger 250 and connected to the exhaust gas pipe 170.

The air supplied through the blower 210 is heated by the downward combustion-type burner 220, and is heat-exchanged in the sensible heat exchanger 240 to heat hot water. The heated hot water is transferred indoors through a supply pipe 261 connected to one side of the sensible heat exchanger 240, is then cooled after transfer of thermal energy, and thereafter returns to a return water pipe 262 connected to one side of the latent heat exchanger 250. Afterwards, the returned water returned to the return water pipe 262 is re-introduced into the latent heat exchanger 250, and condenses water vapor contained in a combustion product passing through the sensible heat exchanger 240 so as to collect latent heat.

At this time, the exhaust gas of the fuel cell portion 100 is also supplied to the latent heat exchanger 250 through the connection pipe 263, and the latent heat exchanger 250 collects not only the exhaust gas of the boiler portion 200 passing through the sensible heat exchanger 240 but also latent heat of the exhaust gas of the fuel cell, thereby enhancing thermal efficiency.

Also, the boiler portion 200 is configured such that the exhaust gas of the boiler portion 200 and the exhaust gas of the fuel cell portion 100 are completely discharged through the exhaust hood 290 so that discharge holes may be unified and the system may be simplified.

The connection pipe 263 has a shape of a bent structure surrounding a side portion of the latent heat exchanger 250 to further enhance the thermal efficiency, and the exhaust gas of the fuel cell portion 100 is supplied to the entire periphery of the latent heat exchanger 250, so that the latent heat exchanger 250 is prevented from being locally overheated.

Figure 3:
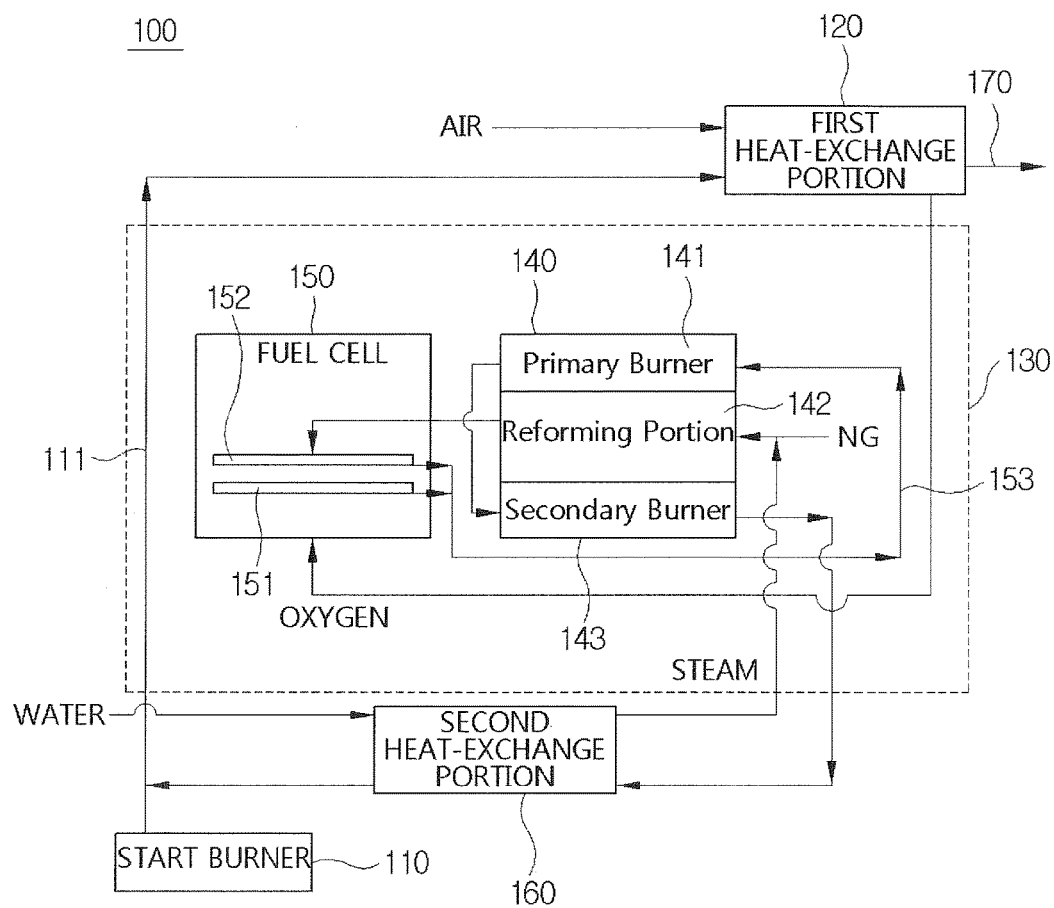
FIG. 3 is a detailed configuration diagram illustrating a fuel cell portion in FIG. 1.

FIG. 3 is a block diagram illustrating the fuel cell portion.

Referring to FIG. 3, the fuel cell portion 100 includes: a start burner 110 for heating a hot box 130 in an initial operation; a first heat exchange portion 120 for heating outside air by heat of the start burner 110 or heat of exhaust gas and supplying the heated air into the hot box 130; a reformer 140 which is located inside the hot box 130 and reforms raw material gas NG; a fuel cell 150 for generating electricity through a catalytic reaction in the hot box 130 by receiving the outside air heated through the first heat exchange portion 120 and the reformed raw material gas from the reformer 140; a second heat exchange portion 160 receiving, through the reformer 140, unreacted exhaust gas which does not react in the fuel cell 150, generating steam using sensible heat of the unreacted exhaust gas to supply the steam together with the raw material gas NG to the reformer 140, and discharging the heat-exchanged unreacted exhaust gas to the air through the first heat exchange portion 120; and an exhaust gas pipe 170 for supplying the exhaust gas of the first heat exchange portion 120 to the boiler portion 200.

A structure and functions of the fuel cell portion 100 used in the present invention having the above-described configuration will be described in more detail. The hot box 130 serves to prevent the reformer 140 and the fuel cell 150 which are accommodated therein from contacting outside air in order to maintain a reaction temperature. The hot box 130 is required to be preheated to the reaction temperature to enhance power generation efficiency even in an initial operation.

In order to satisfy operation conditions of the hot box 130, the hot box 130 is heated to the reaction temperature using the start burner 110 in an initial operation. Assuming the reaction temperature in the fuel cell 150 to be 750° C., a combustion gas line 111 for supplying the air heated by the start burner 110 to the hot box 130 is provided and the hot box 130 is thus heated to a temperature of 750° C.

Although the combustion gas line 111 is illustrated in FIG. 1 as if it passes through the hot box 130 vertically for convenience of description, the combustion gas line 111 really has a wound structure inside the hot box 130.

As described above, the start burner 110 stops operation in a state where the hot box 130 is heated to a reaction temperature by the start burner 110.

The combustion gas line 111 is connected to the first heat exchange portion 120 and serves to heat the outside air supplied from the first heat exchange portion 120 to the hot box 130 through heat exchange.

Here, when the room-temperature outside air is introduced, an internal temperature of the hot box may be lowered. Thus, an internal temperature variation of the hot box may be minimized by heating the outside air and then supplying the heated air.

Accordingly, a decrease in reaction efficiency, that is, a decrease in power generation efficiency may be prevented, and a temperature variation of an overall system is readily expected. Thus, it is easy to design the system such that the system operates in an accurate temperature range.

The heated outside air contains oxygen, and the heated outside air containing oxygen is introduced into the hot box 130 and supplied to a cathode 151 of the fuel cell 150.

Hydrogen is supplied to an anode 152 of the fuel cell 150, and resultantly power is generated by a reaction between hydrogen and oxygen. The reformer 140 is used for supplying hydrogen to the anode 152.

The reformer 140 includes a reforming portion 142, a primary burner 141, and a secondary burner 143, wherein the reformer portion 142 receives a raw material gas NG and the steam of the second heat exchange portion 160 to reform them, and supplies the hydrogen gas to the fuel cell 150.

If necessary, the reformer 140 may have a function of removing carbon monoxide by oxidization. The reformation reaction performed in the reforming portion 142 of the reformer 140 is an endothermic reaction and a continuous supply of heat is necessary to continue the reformation reaction.

In order to supply the heat, the reforming portion 142 is heated by use of the primary and secondary burners 141 and 143.

The primary and secondary burners 141 and 143 are catalyst burners, and heat the reforming portion 142 with heat of about 800 to about 900° C. through an exothermic reaction caused by the reaction between hydrogen and oxygen in the unreacted gas discharged from the fuel cell 150, thereby triggering a reformation reaction.

The reformed raw material gas NG is supplied to the anode 152 of the fuel cell 150 as described above.

Hydrogen is supplied to the anode 152 of the fuel cell 150 and oxygen is supplied to the cathode 152 so that power is generated by the electrical reaction between hydrogen and oxygen. The reaction between oxygen and hydrogen is an exothermic reaction, and accordingly, the temperature of the fuel cell and the internal temperature of the hot box 130 are increased.

Since the increase in the internal temperature of the hot box 130 and the temperature of the fuel cell 150 may cause power generation efficiency of the fuel cell 150 to be lowered again, it is necessary to reduce and maintain the temperature to the reaction temperature by cooling. The cooling process will be described later in more detail.

Power is generated by the reaction between oxygen and hydrogen in the fuel cell 150, and other gases uninvolved in the reaction, or unreacted oxygen and hydrogen, and water vapor mixed with the unreacted oxygen and hydrogen are discharged through the connection pipe 153 which is disposed at the other sides of the cathode 151 and the anode 152.

The connection pipe 153, through which the exhaust gas is discharged, is sequentially connected to the primary and secondary burners 141 and 143, and the unreacted oxygen and hydrogen are sequentially supplied to the primary and secondary burners 141 and 143, so that an exothermic reaction is triggered between oxygen and hydrogen.

Heat generated at this time has a temperature of about 800 to about 900° C. as described above, and is supplied to the reforming portion 142 so that a gas mixture of raw material gas and steam is reformed into hydrogen gas.

Why the burner for heating the reforming portion 142 is divided into the primary burner 141 and the secondary burner 143 is because a discharge of unreacted gas is minimized by gradually reacting oxygen and hydrogen contained in the exhaust gas.

Afterwards, the exhaust gas discharged from the secondary burner 143 is discharged out of the hot box 130 through the exhaust gas pipe 144.

The exhaust gas discharged through the exhaust gas pipe 144 is heated by the primary and secondary burners 141 and 143 and has a temperature close to the reaction temperature. This exhaust gas is supplied to the second heat exchange portion 160 and is heat-exchanged with water supplied from the outside.

The water that was heat-exchanged with the exhaust gas in the second heat exchange portion 160 is phase-changed into a steam state, and mixed with the raw material gas NG to be supplied to the reforming portion 142 as described above.

Also, the exhaust gas deprived of heat by the water in the second heat exchange portion 160 is supplied to the combustion gas line 111 and re-supplied into the hot box 130. The exhaust gas supplied into the hot box 130 is in a state where a temperature is lowered in the second heat exchange portion 160, and thus cools the hot box heated by the exothermic reaction of the fuel cell, so that the temperature of the hot box 130 is lowered to the reaction temperature.

Accordingly, the internal temperature of the hot box 130 may be continuously maintained at the reaction temperature, and the reaction between hydrogen and oxygen is readily performed, thereby preventing power generation efficiency from being decreased.

The exhaust gas passing through the hot box 130 is supplied again to the first heat exchange portion 120. The exhaust gas is heated again while passing through the hot box 130, and thus heats the outside air by heat-exchanging with the outside air introduced from the first heat exchange portion 120. Then, the exhaust gas is supplied to the boiler portion 200 through the exhaust gas pipe 170 after heating the outside air. Behaviors after this have been previously described in detail and will be omitted herein.

As described above, the outside air is heated and then supplied into the hot box 130, thereby making it possible to prevent an internal temperature variation of the hot box 130 caused by supply of the room-temperature outside air.

Thus, according to the present invention, by heating outside air to be supplied, it is possible to prevent an internal temperature variation of the hot box 130 which may be caused when the room-temperature outside air is supplied. Therefore, a decrease in power generation efficiency may be prevented and the temperature increase by an exothermic reaction of the fuel cell 150 may also be reduced using the exhaust gas.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A combined fuel cell and boiler system, comprising:
a fuel cell portion configured for receiving outside air and raw material gas and generating electricity through a catalytic reaction, the fuel cell portion comprising:
 a hot box accommodating a fuel cell and a reformer;
 a start burner for heating the hot box so that the temperature of the hot box is raised to a reaction temperature in an initial operation;
 a first heat exchange portion which heats inhaled outside air by using heat of the start burner or heat of exhaust gas from the hot box and supplies the heated air into the hot box;
 a second heat exchange portion generating steam using heat of the exhaust gas, supplying the steam to the reformer, and maintaining the reaction temperature by cooling the fuel cell using the exhaust gas having a lowered temperature; and
 a combustion gas line provided to surround the fuel cell inside of the hot box, connected to the first heat exchange portion, and is configured to maintain the reaction temperature by heating the hot box using heat of the start burner and by cooling the hot box using the exhaust gas from the second heat exchange portion, and
a condensing boiler portion configured such that exhaust gas of the condensing boiler portion and the exhaust gas of the fuel cell portion are completely discharged through an exhaust hood for unifying discharge holes, the condensing boiler portion comprising:
 a sensible heat exchanger collecting sensible heat emitted by combustion of gas inside a burner;
 a latent heat exchanger connected to an exhaust gas pipe of the fuel cell portion, and collecting the latent heat of self-generated exhaust gas passing from the sensible heat exchanger to the latent heat exchanger together with the latent heat of exhaust gas from the fuel cell portion; and
 a connection pipe connected to the exhaust gas pipe and having a shape of a bent structure surrounding a side portion of the latent heat exchanger for further enhancing the thermal efficiency, the connection pipe being configured for supplying the exhaust gas of the fuel cell portion to the latent heat exchanger, the exhaust gas of the fuel cell portion being supplied to the entire periphery of the latent heat exchanger so that the latent heat exchanger is prevented from being locally overheated,
wherein the first heat exchange portion and the second heat exchange portion are equipped outside of the hot box,
wherein the exhaust gas from the hot box passes through sequentially the second heat exchange portion, the combustion gas line, and the first heat exchange portion.

2. The system of claim 1, wherein the connection pipe guides the exhaust gas of the fuel cell portion to contact a side surface of the latent heat exchanger.

3. The system of claim 1, wherein the reformer comprises:
a reforming portion receiving the raw material gas and steam, and reforming the gas and the steam into hydrogen gas; and
a burner for heating the reforming portion.

4. The system of claim 3, wherein the burner heats the reforming portion by an exothermic reaction in which unreacted oxygen and hydrogen after reaction in the fuel cell are reacted.

5. The system of claim 4, wherein the burner comprises a primary burner and a secondary burner, and the unreacted oxygen and hydrogen are sequentially supplied to the primary and secondary burners.

* * * * *